US012694655B2

(12) United States Patent
Yoon et al.

(10) Patent No.: US 12,694,655 B2
(45) Date of Patent: Jul. 28, 2026

(54) METHOD AND SYSTEM FOR SEPARATING AND RECALIBRATING FEATURE FOR ADVERSARIAL ROBUSTNESS

(71) Applicant: Korea Advanced Institute of Science and Technology, Daejeon (KR)

(72) Inventors: Sung-Eui Yoon, Daejeon (KR); Woo Jae Kim, Daejeon (KR); Yoonki Cho, Daejeon (KR); Junsik Jung, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 280 days.

(21) Appl. No.: 18/639,290

(22) Filed: Apr. 18, 2024

(65) Prior Publication Data

US 2025/0061695 A1 Feb. 20, 2025

(30) Foreign Application Priority Data

Aug. 14, 2023 (KR) ........................ 10-2023-0106035
Jan. 5, 2024 (KR) ........................ 10-2024-0002170

(51) Int. Cl.
*G06V 10/80* (2022.01)
*G06V 10/77* (2022.01)
*G06V 10/82* (2022.01)

(52) U.S. Cl.
CPC .......... *G06V 10/80* (2022.01); *G06V 10/7715* (2022.01); *G06V 10/82* (2022.01)

(58) Field of Classification Search
None
See application file for complete search history.

(56) References Cited

U.S. PATENT DOCUMENTS

| 12,555,365 | B2 * | 2/2026 | Lindvall | .............. | G06V 10/776 |
| 2022/0296924 | A1 * | 9/2022 | Peltola | .................... | G16H 30/40 |
| 2022/0366683 | A1 * | 11/2022 | Pereg | ..................... | G06V 10/25 |

OTHER PUBLICATIONS

Stutz et al., "Disentangling Adversarial Robustness and Generalization", CV, pp. 1-22, 2019 , (Year: 2019).*

* cited by examiner

*Primary Examiner* — Edward Park
(74) *Attorney, Agent, or Firm* — ArentFox Schiff LLP; Joseph M. Maraia

(57) ABSTRACT

Disclosed is a method and system for separating and recalibrating a feature for adversarial robustness. A feature separation and recalibration method may include disentangling an input feature map into a first feature defined as a robust feature and a second feature defined as a non-robust feature, based on a robustness score; generating a recalibrated feature by recalibrating activation of the second feature; and generating an output feature map by combining the first feature and the recalibrated feature.

19 Claims, 4 Drawing Sheets

(a) Overview (b) Separation (c) Recalibration

METHOD AND SYSTEM FOR SEPARATING AND RECALIBRATING FEATURE FOR ADVERSARIAL ROBUSTNESS

CROSS-REFERENCE TO RELATED APPLICATION(S)

This application claims the priority benefit of Korean Patent Application No. 10-2023-0106035, filed on Aug. 14, 2023, and Korean Patent Application No. 10-2024-0002170, filed on Jan. 5, 2024 in the Korean Intellectual Property Office, the disclosure of which is incorporated herein by reference.

BACKGROUND

1. Field of the Invention

Example embodiments relate to a method and system for separating and recalibrating a feature for adversarial robustness.

2. Related Art

Adversarial defense refers to a technique or a method that protects an artificial intelligence model to robustly operate even against an input that contains small noise or distortion called an adversarial example. The adversarial example is an input that appears similar to a general input, but is designed to cause an incorrect answer or an incorrect output of a model. Here, "adversarial" represents an input that is not very different to a human eye, but makes a great difference to a machine learning model. Since such adversarial examples may be used to attack security vulnerability or to degrade performance of the artificial intelligence model, the adversarial defense is regarded as an important security and reliability issue. A representative adversarial defense technique includes an adversarial training method. Adversarial training refers to a technique that adds the adversarial example to training data to train a model to be more robust against an adversarial attack.

Since an existing deep neural network is susceptible to adversarial attacks, a problem arises due to cumulative distortion at a feature level. The existing adversarial defense techniques employ a method of improving model robustness by deactivating a feature that is vulnerable to an attack through feature deactivation. Although this method may improve robustness against an adversarial attack, a deactivated feature may still contain useful information. Therefore, performance and accuracy of a model may be limited.

SUMMARY

Example embodiments provide a method and system for separating and recalibrating a feature for adversarial robustness.

According to an example embodiment, there is provided a feature separation and recalibration method of a computer device including at least one processor, including disentangling, by the at least one processor, an input feature map into a first feature defined as a robust feature and a second feature defined as a non-robust feature, based on a robustness score; generating, by the at least one processor, a recalibrated feature by recalibrating activation of the second feature; and generating, by the at least one processor, an output feature map by combining the first feature and the recalibrated feature.

According to an aspect, the disentangling may include generating a robustness map of the input feature map through a separation network that is trained to learn robustness of a feature and to output a robustness map representing a robustness score of a feature map unit; generating a binary mask based on the robustness map; and separating the first feature and the second feature by applying the binary mask to the input feature map.

According to another aspect, the generating of the binary mask may include generating the binary mask with a differentiable soft mask using Gumbel softmax.

According to still another aspect, the separating of the first feature and the second feature may include obtaining the first feature by computing element-wise product between the input feature map and a positive mask in the binary mask and obtaining the second feature by computing element-wise product between the input feature map and a negative mask in the binary mask.

According to still another aspect, the separation network may include a multi-layer perceptron (MLP)-based auxiliary layer trained to use each of the first feature and the second feature as input and to output a first feature score for the first feature and a second feature score for the second feature, and the auxiliary layer may guide the separation network to assign a relatively higher robustness score to the first feature based on activation preserved in the positive mask in the binary mask, based on separation loss.

According to still another aspect, the separation loss may be computed based on the first feature score, the second feature score, a ground truth label, and a label corresponding to a class with highest prediction score among erroneously predicted classes from a final model output.

According to still another aspect, the generating of the recalibrated feature may include generating a recalibrating unit by adjusting activation of the second feature through a recalibration network trained to receive a feature as input and to adjust activation of the feature; applying a negative mask in a binary mask generated based on a robustness map of the input feature map to the recalibrating unit; and computing the recalibrated feature by combining the recalibrating unit to which the negative mask is applied and the second feature.

According to still another aspect, the recalibration network may include an auxiliary layer that receives the second feature as input and predicts an output prediction score, and the auxiliary layer may guide the recalibration network to adjust activation of the second feature to provide clues relevant to a ground truth label, based on recalibration loss.

According to still another aspect, the recalibration loss may be computed through the ground truth label and the output prediction score.

According to an example embodiment, there is provided a non-transitory computer-readable recording medium storing a program to execute the feature separation and recalibration method on a computer device.

According to an example embodiment, there is provided a computer device including at least one processor configured to execute a computer-readable instruction, wherein the at least one processor is configured to disentangle an input feature map into a first feature defined as a robust feature and a second feature defined as a non-robust feature, based on a robustness score, to generate a recalibrated feature by recalibrating activation of the second feature, and to generate an output feature map by combining the first feature and the recalibrated feature.

According to some example embodiments, there may be provided a method and system for separating and recalibrating a feature for adversarial robustness.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

MODE

Figure 1:
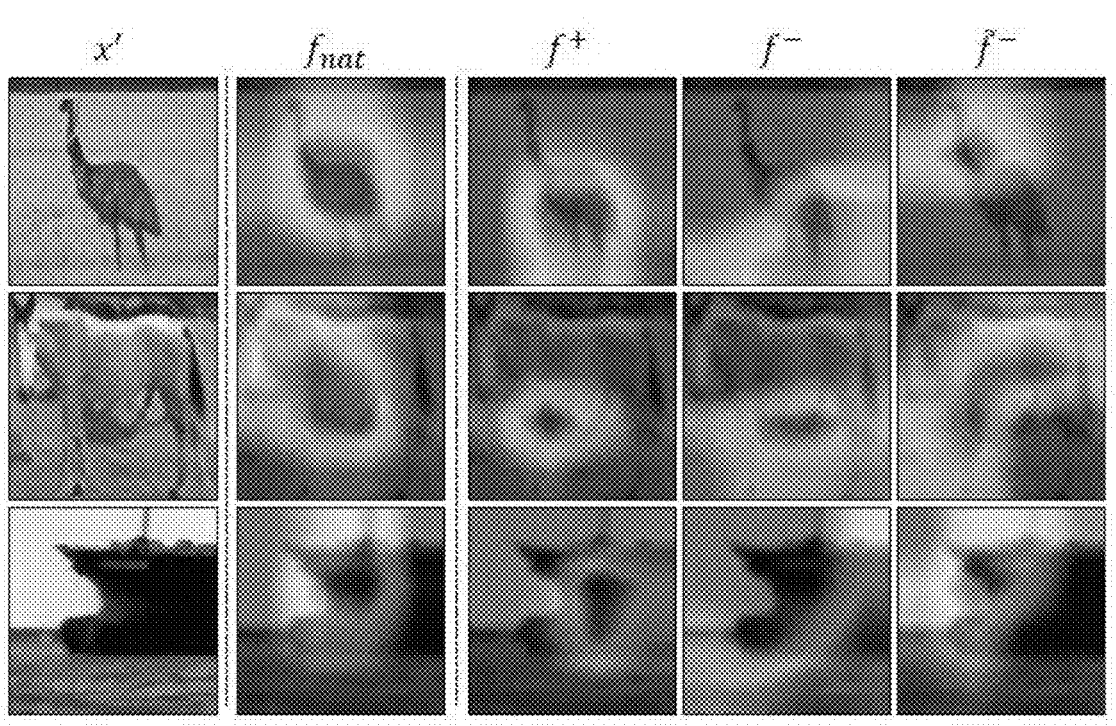
FIG. 1 illustrates examples of images obtained through an adversarial training model equipped with a feature separation and recalibration (FSR) module according to an example embodiment.

Various modifications and alterations may be made to the present invention and various example embodiments may be provided thereto. Hereinafter, specific example embodiments will be described with reference to accompanying drawings.

When it is determined that detailed description may obscure the gist of the present invention in describing the present invention, the detailed description is omitted.

A deep neural network is susceptible to adversarial attacks due to accumulation of perturbations in a feature level and numerous works have boosted model robustness by deactivating non-robust feature activation that causes a model misprediction. However, this malicious activation still contains discriminative cues and, through recalibration, may capture additional useful information for correct model prediction. To this end, example embodiments provide a novel, easy-to-plugin approach named Feature Separation and Recalibration (FSR) that recalibrates non-robust activation for a more robust feature map through separation and recalibration. A separation part disentangles an input feature map into a robust feature with activation that helps the model make a correct prediction and a non-robust feature with activation that is responsible for model misprediction upon adversarial attack. Then, a recalibration part adjusts the non-robust activation to restore potentially useful cues for model prediction. Extensive experiments verify the superiority of FSR compared to traditional deactivation techniques and demonstrate that it improves the robustness of the existing adversarial training method by up to 8.57% with small computational overhead.

Despite the advancement of a deep neural network (DNN) in a computer vision task, the DNN is vulnerable to an adversarial example that is maliciously crafted to subvert a decision of this model by adding imperceptible noise to a natural image. The adversarial example is also known to be successful in real-world cases including autonomous driving and biometrics and to be effective even when a target model is unknown to an attacker. Therefore, it is important to consider an effective defense strategy against this insecurity.

To this end, various defense techniques are proposed, such as defensive distillation, input denoising, and attack detection. Among such methods, adversarial training that makes a model robust by training the model on a set of worst-case adversarial examples has been considered to be most successful and popular.

However, although the adversarial training is used, small adversarial perturbation on a pixel level accumulates to a much larger degree in an intermediate feature space and ruins a final output of the model. To address this problem, a recent advanced method disentangled and deactivated non-robust feature activation that causes a model misprediction. For example, used are approaches of applying a classical denoising technique to deactivate disrupted activation or deactivating a channel irrelevant to a correct model decision. However, the approaches may inevitably neglect discriminative cues that potentially lie in the non-robust activation. Meanwhile, there is a study showing that a model may learn discriminative information from non-robust features. Based on this study's finding, there are potential discriminative cues in the non-robust activation and deactivating them may lead to loss of useful information capable of providing the model with better guidance for making a correct prediction.

In example embodiments, with appropriate adjustment, non-robust activation that leads to a model misprediction may capture discriminative cues for a correct model decision. To this end, example embodiments may provide a feature separation and recalibration (FSR) module that aims to improve feature robustness. The FSR module may separate an intermediate feature map of a model into malicious non-robust activation that is responsible for a model misprediction and robust activation that still provides useful cues for a correct model prediction even under an adversarial attack. However, like the existing methods, exploiting only a robust feature may lead to loss of potentially useful cues in a non-robust feature. Therefore, the FSR module may recalibrate the non-robust activation to capture cues that provide additional useful guidance for a correct model decision. The additional cues may better guide the model to make a correct prediction and thus, improve model robustness.

FIG. 1 illustrates examples of images obtained through an adversarial training model equipped with an FSR module according to an example embodiment. FIG. 1 visualizes attention maps on features of natural images by a naturally trained model ($f_{nat}$) and a robust feature ($f^+$), a non-robust feature ($f^-$), and a recalibrated feature ($\tilde{f}^-$) on an adversarial example (x') obtained from the adversarial training model equipped with the FSR module. Given an adversarial example, while the non-robust feature ($f^-$) captures cues irrelevant to a ground truth class, the robust feature ($f^+$) may capture discriminative cues (e.g., horse's leg). Here, the FSR module may recalibrate non-robust activation ($f^- \rightarrow \tilde{f}^-$) that is neglected by the existing methods and may restore additional useful cues not captured by robust activation (e.g., horse's body). With these additional cues, the FSR module may further boost the model's ability to make a correct decision on the adversarial example.

Due to its simplicity, the FSR module may be easily connected to any layer of a convolutional neural network (CNN) model and may be trained with the entire model in an end-to-end manner. The FSR module may effectively disentangle feature activation based on its effect on a model decision in the separation stage and may successfully capture useful cues for a model prediction in the recalibration stage. Through this, the FSR may improve the robustness of various variants of adversarial training with small computational overhead and may improve robustness of the model by preserving useful information through an approach that recalibrates non-robust activation, instead of simply deactivating the non-robust activation as in the existing techniques.

Related Works: Adversarial Training as Adversarial Defense

Adversarial training guides the model to be robust against adversarial attacks by training the model with adversarially generated data and has been widely considered as one of the most effect defense strategies. It may solve the following minimax optimization problem as shown in Equation 1 below.

$$\min_{\theta} \mathbb{E}_{(x,y) \sim \mathcal{D}} \left[ \max_{\delta} \mathcal{L}_{cls}(F_\theta(x+\delta), y) \right] \qquad \text{[Equation 1]}$$

Here, $F_\theta$ denotes a model parameterized by $\theta$, x denotes a natural image with label y from a dataset D, $\delta$ denotes a perturbation bounded within $\ell_p$-norm of magnitude $\in$ such that $\|\delta\|_p \leq \in$, and $L_{cls}(\cdot, \cdot)$ denotes classification loss. Inner maximization aims to find a strongest possible perturbation $\delta$ that maximizes the classification loss and outer minimization learns the model to minimize the loss with respect to a worst-case adversarial example. To optimize the inner maximization, a fast gradient sign method (FGSM) or a projected gradient descent (PDG) attack may be used.

In recent years, many variants of adversarial training have emerged. For example, various techniques have emerged, such as a technique for reducing a distance between a logit from a natural image and its adversarial counterpart, a technique for decomposing a prediction error on an adversarial example into a natural error and a boundary error to improve both robustness and accuracy, a technique for additionally considering a misclassified example during training, a technique being inspired by curriculum learning and training a model with an increasingly stronger adversarial example, a technique proposing a self-ensemble method that combines weights of various models through a training process, and a technique for applying second-order statistics to a model weight to improve adversarial training robustness. Due to its simplicity, a feature separation and recalibration method according to example embodiments may be easily plugged into any one of various adversarial training techniques and may further improve the robustness.

Related Works: Adversarial Defense on Feature Space

In a parallel line of research, it has been found that some prior models learn a non-robust feature from a dataset and that an input perturbation of an adversarial example is often accumulated through an intermediate layer and misguides a final prediction. To solve this problem, several works tried to learn robust feature representation by modifying a network structure or by applying regularization. For example, there are a technique that studies adversarial vulnerability from the perspective of batch normalization, a technique that applies pruning to a random activation set, particularly, activation with small magnitude, a technique that prunes out activation vulnerable to an adversarial attack, and a technique that proposes a class-wise feature disentanglement and pushes centers of the respective classes from each other to learn more discriminative feature representation.

Also, there have been attempts to reduce abnormality in a feature map by explicitly manipulating feature activation. For example, there are a technique that proposes k-Winner-Takes-All activation to deactivate all feature units except for k units with largest magnitude, a technique that interprets effect of adversarial perturbation on pixel, image, and network levels and masks out a feature unit sensitive to perturbation, a technique that applies an attention mechanism to emphasize an important region on a feature map, a technique that proposes feature denoising (FD) for applying a classical denoising technique to deactivate abnormal activation, a technique that studied the effect of perturbation on feature activation from a channel perspective and proposes Channel Activation Suppression (CAS) and Channel-wise Importance-based Feature Selection (CIFS), respectively, to deactivate the activation of non-robust channels.

In contrast to the methods, example embodiments propose a recalibration strategy. Existing deactivation strategies simply discard non-robust feature activation responsible for a model mistake. Taking a step further, the example embodiments may readjust such activation to recapture potentially discriminative cues and boost model robustness.

Feature Separation and Recalibration Method

Although distorted feature activation upon adversarial attack is known to be responsible for model misprediction, the FSR module may recapture useful cues for model prediction through adjustment and may fully utilize such potentially useful cues.

Figure 2:
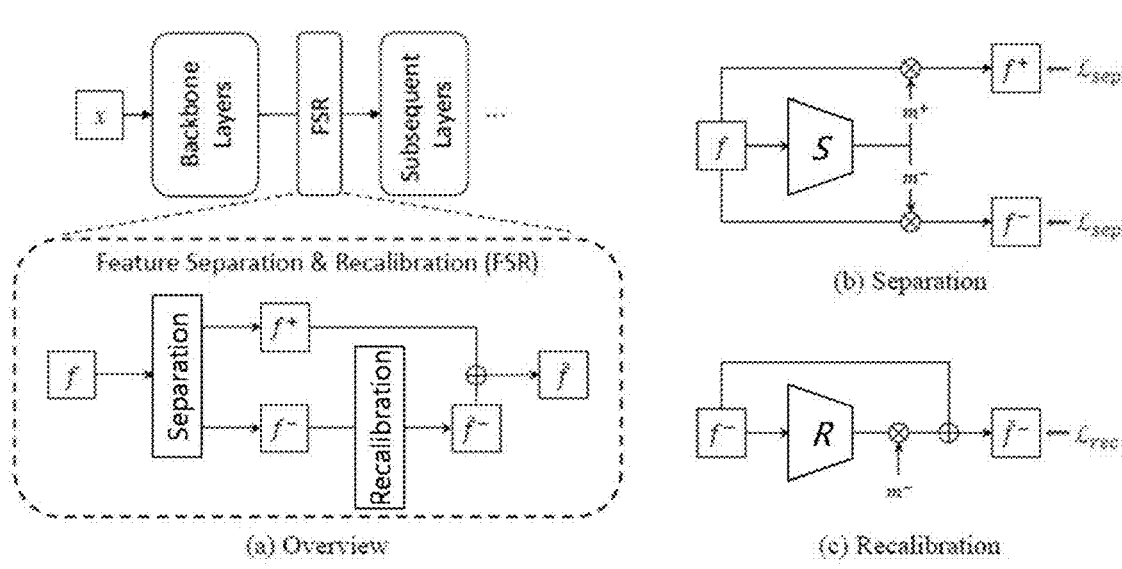
FIG. 2 illustrates an example of an FSR module according to an example embodiment.

FIG. 2 illustrates an example of an FSR module according to an example embodiment. During a separation stage, the FSR module may disentangle a feature map into a robust feature and a non-robust feature by masking out non-robust or robust activation. Then, during a recalibration stage, the FSR module may recalibrate activation of the non-robust feature and may provide useful information for correct model prediction. As shown in the example embodiment of FIG. 2, the FSR module may be inserted into any layer of a model and may improve robustness due to its simplicity.

Feature Separation

As compared to a recent approach that makes a feature map robust by deactivating non-robust activation, the FSR module may recalibrate the feature map to restore potentially useful cues for model prediction. To this end, during the separation stage, the FSR module may extract non-robust activation to be recalibrated from an input intermediate feature map. To determine which activation is robust or non-robust, a separation network S that learns robustness of each feature unit may be employed. When the intermediate feature map $f \in \mathbb{R}^{C \times H \times W}$ is given as input, C, H, and W may represent channel, height, and width dimensions of f, respectively. The separation network outputs a robustness map $r \in \mathbb{R}^{C \times H \times W}$ that represents the robustness score of a corresponding unit of f. Here, a higher score may represent more robust feature activation.

To extract the non-robust feature, the FSR module may disentangle the feature map into the robust feature and the non-robust feature in an element-wise manner based on the robustness score. For example, a binary mask $b \in \{0, 1\}^{C \times H \times W}$ generated based on the robustness score may be applied to the feature map. However, such discrete sampling is non-differentiable and discontinuous, which may cause gradient masking that may give the false sense of robustness.

To prevent this problem, an example embodiment may approximate a binary mask b with a differentiable soft mask $m \in [0, 1]^{C \times H \times W}$ as shown in Equation 2 below, using Gumbel softmax.

$$m = \frac{e^{\left((\log(\sigma(r)) + g_1)/\tau\right)}}{e^{\left((\log(\sigma(r)) + g_1)/\tau\right)} + e^{\left((\log(1 - \sigma(r)) + g_2)/\tau\right)}} \qquad \text{[Equation 2]}$$

Here, r denotes a robustness map and σ denotes a sigmoid function used to normalize the robustness map. $g_1$ and $g_2$ represent samples extracted from the Gumbel distribution such that $g=-\log(-\log(u))$. Here, u~Uniform(0, 1), and τ denotes a temperature used to control the effect of $g_1$ and $g_2$. During inference, to avoid stochasticity from sampling $g_1$ and $g_2$, they are fixed to $-\log((-\log(u_c))$. Here, $u_c \in \mathbb{R}^{C \times H \times W}$ denotes an expected value of Uniform distribution. By computing two-class Gumbel softmax between the normalized robustness map and its inverted version, a mask m with values close to 1 is obtained for high robustness score and values close to 0 for low robustness score is obtained. Then, to mask out the non-robust activation from the input feature f and to obtain the robust feature $f^+$, element-wise product between the feature f and a positive mask $m^+=m$ may be computed such that $f^+=m^+ \otimes f$. Similarly, the non-robust feature $f^-=m^- \otimes f$ may be obtained by masking out the robust activation with a negative mask $m^-=1-m$.

However, without any guidance, the separation network may not learn a correct robustness score for each activation. To this end, the example embodiment may design an objective that guides the separation network to learn the robustness score based on the influence of feature activation on model making a correct prediction or an incorrect prediction. The example embodiment may use a multi-layer perceptron (MLP)-based auxiliary layer h that uses each of two features $f^+$ and $f^-$ as input and outputs prediction scores $p^+$ and $p^-$, respectively, and may compute separation loss $L_{sep}$ as shown in Equation 3 below.

$$\mathcal{L}_{sep} = -\sum_{i=1}^{N}(y_i \cdot \log(p_i^+) + y_i' \cdot \log(p_i^-))$$ [Equation 3]

Here, N denotes the number of classes, y denotes a ground truth label, and y' denotes a label corresponding to a class with a highest prediction score among erroneously predicted classes from a final model output. By training the auxiliary layer to make a correct prediction based on activation that is preserved from the positive mask $m^+$, $L_{sep}$ may guide the separation network to assign a high robustness score to a unit that helps the auxiliary layer make a correct prediction. At the same time, it is an aim to disentangle the highly disrupted activation that causes the model to make a misprediction upon adversarial attack. Also, $L_{sep}$ may guide the separation network to assign a low robustness score to non-robust activation that is specifically responsible for the most probable misprediction.

With $L_{sep}$, the separation network may effectively separate the robust feature activation and the non-robust feature activation. Discarding the non-robust activation is one method to improve feature robustness, however, this approach may ignore potentially useful cues that may be recaptured through recalibration. Hereinafter, a method of capturing additional useful cues for feature robustness improvement through recalibration of the disentangled non-robust activation is described.

Feature Recalibration

Similar to recent techniques, exploiting only the robust feature obtained through the separation stage may lead to loss of potentially useful cues for model prediction that may further boost the model robustness. Therefore, for the first time, the non-robust feature activation may be adjusted to capture the additional useful cues during the recalibration stage. First, a recalibration network R that uses the non-robust feature $f^-$ as input and outputs a recalibrating unit designed to adjust activation of $f^-$ accordingly may be used. To recalibrate the non-robust activation designated by the robustness map, the FSR module may apply the negative mask $m^-$ to the recalibrating unit. Finally, the FSR module may compute the recalibrated feature $\tilde{f}^-$ by adding the result to $f^-$, that is, $\tilde{f}^-=f^-+m^- \otimes R(f^-)$.

The goal of the recalibration stage is to make the non-robust activation recapture cues that may help the model make a correct decision. To achieve this goal, the FSR module may attach again the auxiliary layer after the recalibrated feature $\tilde{f}^-$ and may compute recalibration loss $L_{rec}$ as shown in Equation 4 below.

$$\mathcal{L}_{rec} = -\sum_{i=1}^{N} y_i \cdot \log(\tilde{p}_i^-)$$ [Equation 4]

Here, $\tilde{p}^-$ denotes an output prediction score of the auxiliary layer given $\tilde{f}^-$ as input. The example embodiment may train the same auxiliary layer to make a correct decision based on the recalibrated feature and thereby guide the recalibration network to adjust the non-robust activation to provide cues relevant to a ground truth class. After the recalibration stage, the FSR module may add the robust feature $f^+$ and the recalibrated non-robust feature $\tilde{f}^-$ in an element-wise manner to obtain the output feature map $\tilde{f}=f^++\tilde{f}^-$, which may be delivered to a subsequent layer of the model. Through the recalibration stage, additional useful cues may be captured from the non-robust activation that is neglected in previous approaches.

Model Training

The proposed FSR module may be easily inserted into any layer of the model and may be trained with the entire model in an end-to-end manner due to its simplicity. Also, the proposed method may be applied with classification loss $L_{cls}$ for various types of adversarial training and an overall objective function may be expressed as shown in Equation 5 below.

$$\mathcal{L} = \mathcal{L}_{cls} + \frac{1}{|L|}\sum_{l \in L}\left(\lambda_{sep} \cdot \mathcal{L}_{sep}^l + \lambda_{rec} \cdot \mathcal{L}_{rec}^l\right)$$ [Equation 5]

Here, L represents a set of positions at which the FSR module is inserted, and $$\mathcal{L}_{sep}^l$$

and $$\mathcal{L}_{rec}^l$$

represent separation loss and recalibration loss, respectively, applied to the FSR module at a l-th layer. Hyperparameters $\lambda_{sep}$ and $\lambda_{rec}$ may be used to control weights of $L_{sep}$ and $L_{rec}$, respectively. Addition of this simple FSR module may improve the robustness of an adversarial training method against both a white-box attack and a black-box attack with small computation overhead.

A feature separation and recalibration system according to example embodiments may be implemented by at least one computer device and a feature separation and calibration method according to example embodiments may be performed through the at least one computer device included in the feature separation and recalibration system. A computer program according to an example embodiment may be installed and run on the computer device and the computer device may perform the feature separation and recalibration method according to example embodiments under control of the running computer program. The aforementioned computer program may be stored in computer-readable recording media to execute the feature separation and recalibration method on the computer device in conjunction with the computer device.

Figure 3:
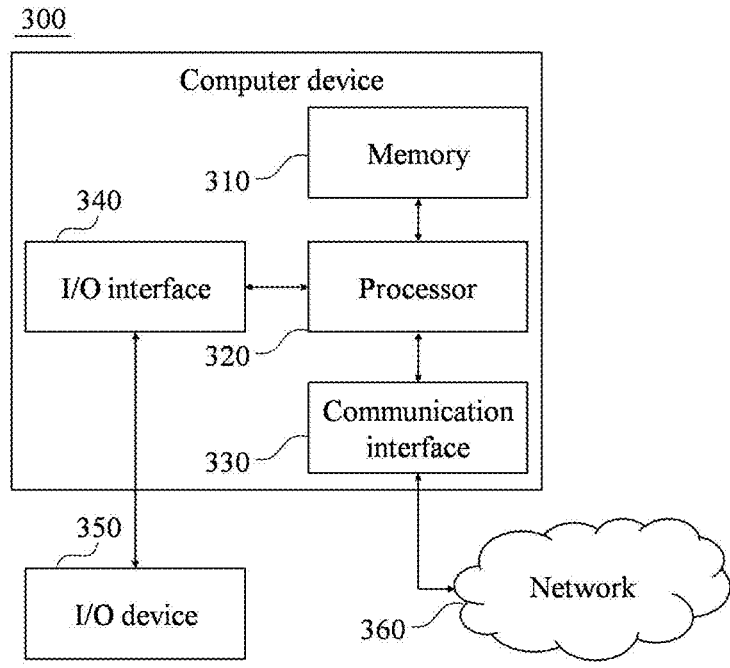
FIG. 3 is a block diagram illustrating an example of a computer device according to an example embodiment.

FIG. 3 is a block diagram illustrating an example of a computer device according to an example embodiment. Referring to FIG. 3, a computer device 300 may include a memory 310, a processor 320, a communication interface 330, and an input/output (I/O) interface 340. The memory 310 may include, as computer-readable recording media, a permanent mass storage device, such as random access memory (RAM), read only memory (ROM), and disk drive. Here, the permanent mass storage device, such as ROM and disk drive, may be included in the computer system 300 as a separate permanent storage device from the memory 310. Also, an operating system (OS) and at least one program code may be stored in the memory 310. Such software components may be loaded to the memory 310 from computer-readable recording media separate from the memory 310. Examples of the separate computer-readable recording media may include computer-readable recording media, such as a floppy drive, a disk, a tape, a DVD/CD-ROM drive, and a memory card. In another example embodiment, software components may be loaded to the memory 310 through the communication interface 330, rather than the computer-readable recording media. For example, the software components may be loaded to the memory 310 of the computer system 300 based on a computer program installed by files received through a network 360.

The processor 320 may be configured to process an instruction of a computer program by performing basic arithmetic, logic, and I/O operations. The instruction may be provided from the memory 310 or the communication interface 330 to the processor 320. For example, the processor 320 may be configured to execute the received instruction according to a program code stored in a storage device, such as the memory 310.

The communication interface 330 may provide a function for communication between the computer system 300 and another apparatus through the network 360. For example, a request or an instruction created by the processor 320 of the computer system 300 according to a program code stored in a storage device such as the memory 310, data, and a file may be delivered to other apparatuses over the network 360 under control of the communication interface 330. Inversely, a signal or an instruction, data, and a file from another apparatus may be received at the computer system 300 through the communication 330 of the computer system 300 over the network 360. The received signal or instruction and data may be delivered to the processor 320 or the memory 310 through the communication interface 330 and the file may be stored in a storage medium (the aforementioned permanent storage device) further includable in the computer system 300.

The I/O interface 340 may be a device for interfacing with an I/O device 350. For example, an input device may include a device, such as a microphone, a keyboard, a camera, and a mouse, and an output device my include a device, such as a display and a speaker. As another example, the I/O interface 340 may be a device for interfacing with a device in which an input function and an output function are integrated into a single function, such as a touchscreen. The I/O device 350 may be configured as a single device with the computer system 300.

Also, in other example embodiments, the computer system 300 may include a greater or smaller number of components than the number of components shown in FIG. 3. However, there is no need to clearly illustrate many conventional components. For example, the computer system 300 may be implemented to include at least a portion of the I/O device 350 or may further include other components, such as a transceiver and a database.

Figure 4:
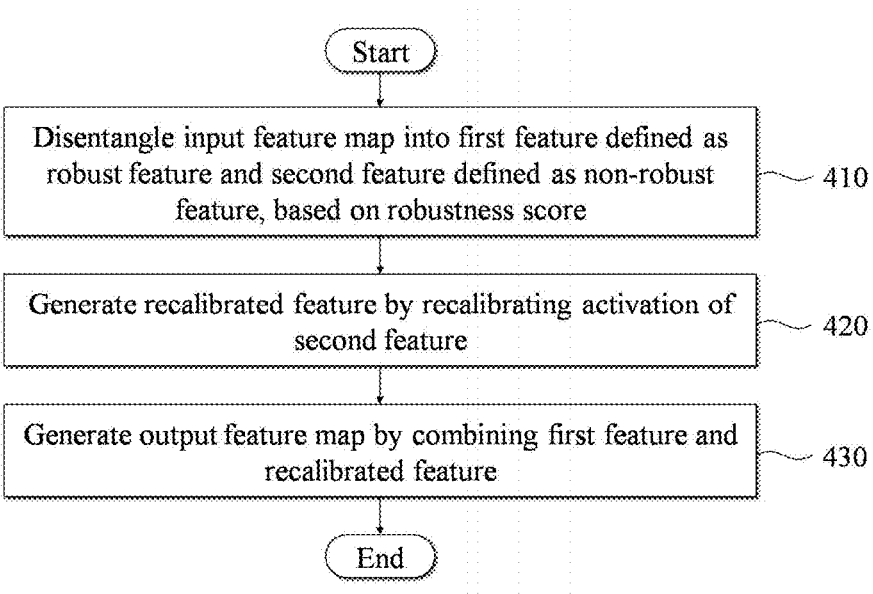
FIG. 4 is a flowchart illustrating a feature separation and recalibration method according to an example embodiment.

FIG. 4 is a flowchart illustrating an example of a feature separation and recalibration method according to an example embodiment. The feature separation and recalibration method may be performed by the computer device 300 of FIG. 3. Here, the processor 320 of the computer device 300 may be implemented to execute a control instruction in response to a code of at least one computer program or a code of an OS included in the memory 310. Here, the processor 320 may control the computer device 300 to perform operations 410 to 440 included in the method of FIG. 4 in response to a control instruction provided from a code stored in the computer device 300.

In operation 410, the computer device 300 may disentangle an input feature map into a first feature defined as a robust feature and a second feature defined as a non-robust feature, based on a robustness score. For example, the computer device 300 may generate a robustness map of the input feature map through a separation network that is trained to learn robustness of a feature and to output a robustness map representing a robustness score of a feature map unit. The separation network may include an MLP-based auxiliary layer trained to use each of the first feature and the second feature as input and to output a first feature score for the first feature and a second feature score for the second feature. Here, the auxiliary layer may guide the separation network to assign a relatively higher robustness score to the first feature based on activation preserved in a positive mask in a binary mask, based on separation loss. Here, the separation loss may be computed based on the first feature score, the second feature score, a ground truth label, and a label corresponding to a class with highest prediction score among erroneously predicted classes from a final model output. For example, the separation loss may be computed as shown in Equation 3 described above. Also, the computer device 300 may generate the binary mask based on the robustness map. Here, the computer device 300 may generate the binary mask with a differentiable soft mask using Gumbel softmax. The soft mask is described above with reference to Equation 2. Also, the computer device 300 may separate the first feature and the second feature by applying the binary mask to the input feature map. Here, the computer device 300 may obtain the first feature by computing element-wise product between the input feature map and a positive mask in the binary mask and may obtain the second feature by computing element-wise product between the input feature map and a negative mask in the binary mask.

In operation 420, the computer device 300 may generate a recalibrated feature by recalibrating activation of the second feature. For example, the computer device 300 may generate a recalibrating unit by adjusting activation of the second feature through a recalibration network trained to receive a feature as input and to adjust activation of the feature. Here, the recalibration network may include an auxiliary layer that receives the second feature as input and predicts an output prediction score, and the auxiliary layer may guide the recalibration network to adjust activation of the second feature to provide clues relevant to a ground truth label, based on recalibration loss. Here, the recalibration loss may be computed through the ground truth label and the output prediction score. An example of computing the recalibration loss is described above with reference to Equation 4. Also, the computer device 300 may apply the negative mask in the binary mask generated based on the robustness map of the input feature map to the recalibrating unit, and may compute the recalibrated feature by combining the recalibrating unit to which the negative mask is applied and the second feature ($\tilde{f}^-=f^-+m^-\otimes R(f^-)$).

In operation 430, the computer device 300 may generate an output feature map by combining the first feature and the recalibrated feature. It is described that the output feature map $\tilde{f}=f^++\tilde{f}^-$ may be obtained by combining the first feature $f^+$ defined as the robust feature and the recalibrated non-robust feature $\tilde{f}^-$.

As described above, according to example embodiments, it is possible to provide a method and system for separating and recalibrating a feature for adversarial robustness. The method and system for feature separation and recalibration improved robustness for an adversarial example in CIFAR-10 and SVHN datasets. Corresponding performance improvement may be verified from Table 1 below. The corresponding Table 1 shows classification accuracy (%) of each defense technique (first column) for various adversarial attacks (FGSM, PGD-20, PGD-100, C&W, and Ensemble).

showing high performance in an adversarial environment in the real world. In particular, adversarial defense plays an important role in the field with high security requirements.

The systems or the apparatuses described herein may be implemented using hardware components, and/or combination of the hardware components and the software components. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or at least one combination thereof, for independently or collectively instructing or configuring the processing device to operate as desired. Software and/or data

TABLE 1

| ResNet-18 | CIFAR-10 | | | | | | SVHN | | | | | |
|---|---|---|---|---|---|---|---|---|---|---|---|---|
| Method | Natural | FGSM | PGD-20 | PGD-100 | C&W | Ensemble | Natural | FGSM | PGD-20 | PGD-100 | C&W | Ensemble |
| AT | 85.02 | 56.21 | 48.22 | 46.37 | 47.38 | 45.51 | 91.21 | 55.55 | 40.85 | 37.54 | 40.61 | 37.41 |
| AT + FSR | 81.46 | 58.07 | 52.47 | 51.02 | 49.44 | 48.34 | 91.28 | 60.46 | 43.94 | 39.01 | 43.22 | 38.81 |
| TRADES | 86.31 | 57.23 | 50.74 | 49.44 | 48.66 | 47.89 | 90.99 | 61.33 | 47.12 | 43.55 | 45.48 | 42.99 |
| TRADES + FSR | 84.49 | 58.29 | 52.27 | 51.28 | 49.92 | 49.28 | 91.39 | 68.85 | 51.49 | 47.50 | 46.70 | 46.17 |
| MART | 82.73 | 56.65 | 50.88 | 49.15 | 47.21 | 45.98 | 90.50 | 58.21 | 43.61 | 40.43 | 42.20 | 40.07 |
| MART + FSR | 83.28 | 59.55 | 54.80 | 53.69 | 48.98 | 48.36 | 89.87 | 61.06 | 46.51 | 42.94 | 43.89 | 42.40 |

When applied to various adversarial training techniques, such as AT, TRADES, and MART, it can be seen that the method and system for feature separation and recalibration improves the robustness against various adversarial attacks.

Adversarial defense research relates to the field that studies techniques and methods to protect a machine learning model, such as a deep neural network, to operate robustly against an adversarial example and this research is having significant impact in various areas and has the following effects.

1. Improving model robustness: The adversarial defense research relates to developing a method of improving a model to operate more robustly against an adversarial attack. This may allow the model to exhibit better performance on both general data and an adversarial example, which may lead to generating a more reliable model.

2. Mitigating security vulnerability: The adversarial defense research helps identify and address vulnerability of the model. A robust artificial intelligence model may be generated for adversarial examples generated by malicious users to attack the model.

3. AI model useful for real-world application: The adversarial defense research helps develop an AI model may be embodied in any type of machine, component, physical equipment, virtual equipment, computer storage medium or device, to provide instructions or data to the processing device or be interpreted by the processing device. The software also may be distributed over network coupled computer systems so that the software is stored and executed in a distributed fashion. The software and data may be stored in one or more computer readable storage mediums.

The methods according to the example embodiments may be recorded in non-transitory computer-readable media including program instructions to be performed through various computer methods. The media may include, alone or in combination with program instructions, data files, data structures, and the like. Here, the media may continuously store a computer-executable program or may temporarily store the same for execution or download. Also, the media may be various recording devices or storage devices in which a single piece of hardware or a plurality of hardware is combined and may be distributed over a network without being limited to media directly connected to a computer system. Examples of non-transitory computer-readable media include magnetic media such as hard disks, floppy disks, and magnetic tapes; optical media such as CD ROM disks and DVDs; magneto-optical media such as floptical disks; and hardware devices that are specially designed to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both a machine code, such as code produced by a compiler, and a higher level code that may be executed by the computer using an interpreter.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A feature separation and recalibration method of a computer device comprising at least one processor, comprising:

disentangling, by the at least one processor, an input feature map into a first feature defined as a robust feature and a second feature defined as a non-robust feature, based on a robustness score;

generating, by the at least one processor, a recalibrated feature by recalibrating activation of the second feature; and generating, by the at least one processor, an output feature map by combining the first feature and the recalibrated feature.

2. The feature separation and recalibration method of claim 1, wherein the disentangling comprises:

generating a robustness map of the input feature map through a separation network that is trained to learn robustness of a feature and to output a robustness map representing a robustness score of a feature map unit;

generating a binary mask based on the robustness map; and separating the first feature and the second feature by applying the binary mask to the input feature map.

3. The feature separation and recalibration method of claim 2, wherein the generating of the binary mask comprises generating the binary mask with a differentiable soft mask using Gumbel softmax.

4. The feature separation and recalibration method of claim 2, wherein the separating of the first feature and the second feature comprises obtaining the first feature by computing element-wise product between the input feature map and a positive mask in the binary mask and obtaining the second feature by computing element-wise product between the input feature map and a negative mask in the binary mask.

5. The feature separation and recalibration method of claim 2, wherein the separation network includes a multi-layer perceptron (MLP)-based auxiliary layer trained to use each of the first feature and the second feature as input and to output a first feature score for the first feature and a second feature score for the second feature, and the auxiliary layer guides the separation network to assign a relatively higher robustness score to the first feature based on activation preserved in the positive mask in the binary mask, based on separation loss.

6. The feature separation and recalibration method of claim 5, wherein the separation loss is computed based on the first feature score, the second feature score, a ground truth label, and a label corresponding to a class with highest prediction score among erroneously predicted classes from a final model output.

7. The feature separation and recalibration method of claim 1, wherein the generating of the recalibrated feature comprises:

generating a recalibrating unit by adjusting activation of the second feature through a recalibration network trained to receive a feature as input and to adjust activation of the feature;

applying a negative mask in a binary mask generated based on a robustness map of the input feature map to the recalibrating unit; and computing the recalibrated feature by combining the recalibrating unit to which the negative mask is applied and the second feature.

8. The feature separation and recalibration method of claim 7, wherein the recalibration network includes an auxiliary layer that receives the second feature as input and predicts an output prediction score, and the auxiliary layer guides the recalibration network to adjust activation of the second feature to provide clues relevant to a ground truth label, based on recalibration loss.

9. The feature separation and recalibration method of claim 8, wherein the recalibration loss is computed through the ground truth label and the output prediction score.

10. A non-transitory computer-readable recording medium storing instructions that, when executed by a processor, cause the processor to perform a feature separation and recalibration method on a computer device, the feature separation and recalibration method comprising:

disentangling an input feature map into a first feature defined as a robust feature and a second feature defined as a non-robust feature, based on a robustness score;

generating a recalibrated feature by recalibrating activation of the second feature; and generating an output feature map by combining the first feature and the recalibrated feature.

11. The non-transitory computer-readable recording medium of claim 10, wherein the disentangling comprises:

generating a robustness map of the input feature map through a separation network that is trained to learn robustness of a feature and to output a robustness map representing a robustness score of a feature map unit;

generating a binary mask based on the robustness map; and separating the first feature and the second feature by applying the binary mask to the input feature map.

12. The non-transitory computer-readable recording medium of claim 11, wherein the separation network includes a multi-layer perceptron (MLP)-based auxiliary layer trained to use each of the first feature and the second feature as input and to output a first feature score for the first feature and a second feature score for the second feature, and the auxiliary layer guides the separation network to assign a relatively higher robustness score to the first feature based on activation preserved in the positive mask in the binary mask, based on separation loss.

13. The non-transitory computer-readable recording medium of claim 10, wherein the generating of the recalibrated feature comprises:

generating a recalibrating unit by adjusting activation of the second feature through a recalibration network trained to receive a feature as input and to adjust activation of the feature;

applying a negative mask in a binary mask generated based on a robustness map of the input feature map to the recalibrating unit; and computing the recalibrated feature by combining the recalibrating unit to which the negative mask is applied and the second feature.

14. The non-transitory computer-readable recording medium of claim 13, wherein the recalibration network includes an auxiliary layer that receives the second feature as input and predicts an output prediction score, and the auxiliary layer guides the recalibration network to adjust activation of the second feature to provide clues relevant to a ground truth label, based on recalibration loss.

15. A computer device comprising:

at least one processor configured to execute a computer-readable instruction, wherein the at least one processor is configured to, disentangle an input feature map into a first feature defined as a robust feature and a second feature defined as a non-robust feature, based on a robustness score, generate a recalibrated feature by recalibrating activation of the second feature, and generate an output feature map by combining the first feature and the recalibrated feature.

16. The computer device of claim 15, wherein, to disentangle the input feature map, the at least one processor is configured to, generate a robustness map of the input feature map through a separation network that is trained to learn robustness of a feature and to output a robustness map representing a robustness score of a feature map unit, generate a binary mask based on the robustness map, and separate the first feature and the second feature by applying the binary mask to the input feature map.

17. The computer device of claim 16, wherein the separation network includes a multi-layer perceptron (MLP)-based auxiliary layer trained to use each of the first feature and the second feature as input and to output a first feature score for the first feature and a second feature score for the second feature, and the auxiliary layer guides the separation network to assign a relatively higher robustness score to the first feature based on activation preserved in the positive mask in the binary mask, based on separation loss.

18. The computer device of claim 15, wherein, to generate the recalibrated feature, the at least one processor is configured to, generate a recalibrating unit by adjusting activation of the second feature through a recalibration network trained to receive a feature as input and to adjust activation of the feature, apply a negative mask in a binary mask generated based on a robustness map of the input feature map to the recalibrating unit, and compute the recalibrated feature by combining the recalibrating unit to which the negative mask is applied and the second feature.

19. The computer device of claim 18, wherein the recalibration network includes an auxiliary layer that receives the second feature as input and predicts an output prediction score, and the auxiliary layer guides the recalibration network to adjust activation of the second feature to provide clues relevant to a ground truth label, based on recalibration loss.

*    *    *    *    *